INVENTORS
THOMAS W. WALDROP
HARRY C. EBERLY
BY John E. Becker
ATTORNEY

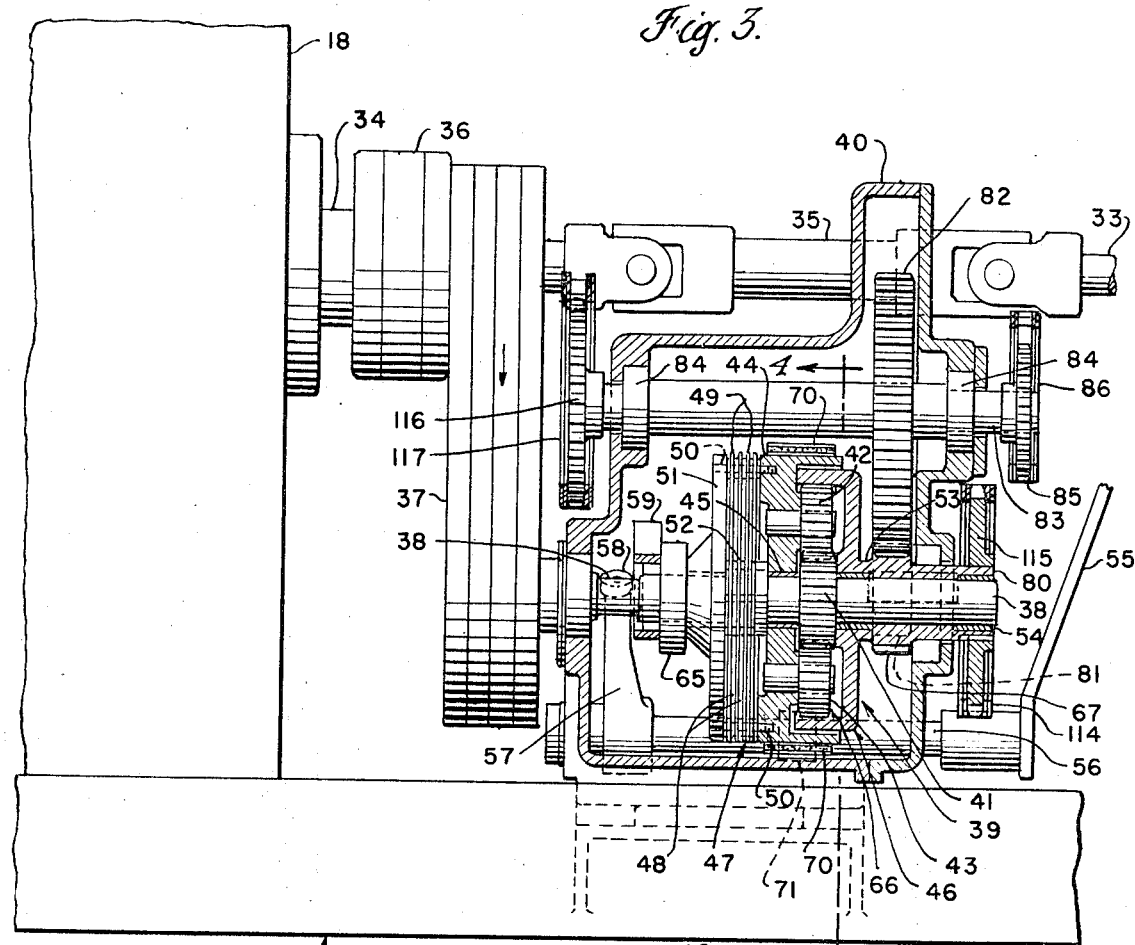
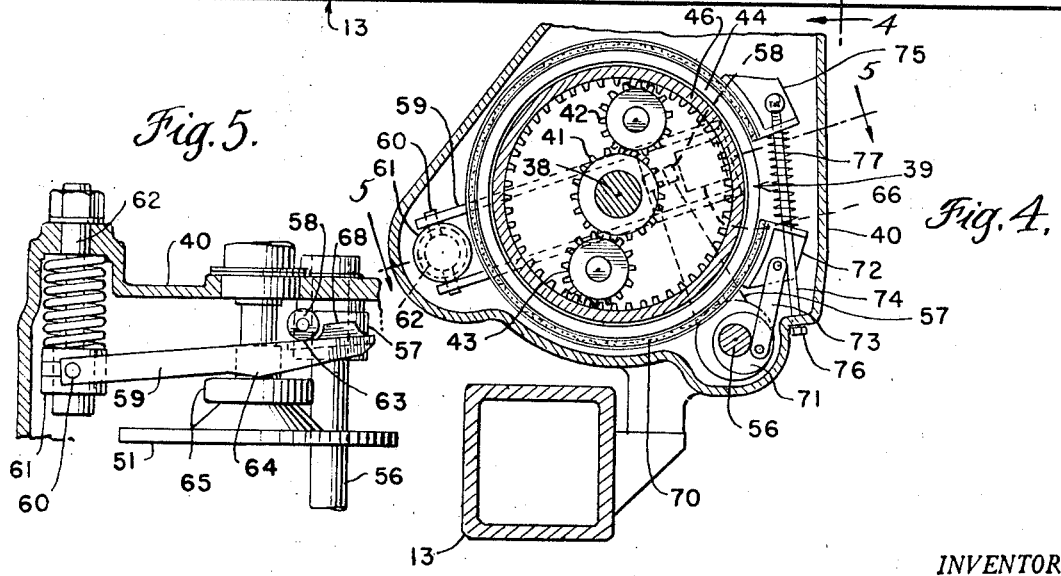

INVENTORS
THOMAS W. WALDROP
HARRY C. EBERLY
BY John E. Becker
ATTORNEY

United States Patent Office 3,523,411
Patented Aug. 11, 1970

3,523,411
FORAGE HARVESTER DRIVE
Thomas W. Waldrop, Ronks, and Harry C. Eberly, Narvon, Pa., assignors to Sperry Rand Corporation, New Holland, Pa., a corporation of Delaware
Filed Mar. 4, 1968, Ser. No. 710,081
Int. Cl. A01d 87/00
U.S. Cl. 56—344      9 Claims

ABSTRACT OF THE DISCLOSURE

A forage harvester comprising in combination a wheeled frame support for a cutterhead for comminuting crop material, upper and lower infeed conveyors for delivering crop material in a mat-like form to said cutterhead, power for operatively driving the cutterhead and operating the conveyors, a slip clutch for providing a safety overload for the conveyors, and whereby the slip clutch provides an inherently smooth forward and reverse drive with the reverse drive being substantially slower to better clear the conveyors in the event plugging occurs.

BACKGROUND OF THE INVENTION

This invention relates to improvements in forage harvesting machines adapted to normally travel in a forward direction. The header at the front thereof under variable circumstances may include suitable mower means to cut the crop material from the ground and conveyor means to convey it upwardly and rearwardly to infeed rolls disposed adjacently forward of the cutterhead. These infeed rolls meter the crop material rearwardly into the cutterhead which chops the material into small particles and propels this comminuted material up and out of a usually rearwardly directed discharge spout into a suitable receptacle. Whether the harvester carries its own power source or receives it from the power take-off shaft of a draft vehicle, the usual arrangement provides for a positively and continuously driven infeed and cutterhead operation by the main drive of the source used. In conventional machines, it is well known to have the operating mechanism of the feed conveying means, which are usually rolls, and related structures selectively engageable or disengageable, i.e., neutral, or reversible, as a unit, by the take-off drive and usually embodies a conventional jaw clutch.

The primary disadvantage of this conventional arrangement is that the use of such a jaw clutch imparts a violent stop-and-start operation which subjects the entire mechanism to undesirable shock loading. A secondary disadvantage is that the jaw type of clutch cannot be easily shifted from forward to reverse due to the large friction factor inherent in its design and without first being held in neutral for a period long enough to allow the rotary momentum of the header and feed rolls to subside. Still another disadvantage of this prior art arrangement is that if the machines become plugged with crop and/or other foreign material and it is desirable to reverse the feed rolls for unplugging thereof, then the jaw type clutch drives in reverse at the same speed that it drives forwardly, and accordingly, the material then is abruptly thrown out the front of the machine onto the ground.

The present invention solves the forementioned problems and overcomes the disadvantages related thereto.

SUMMARY OF THE INVENTION

Having in mind the foregoing background of the invention, and the related problems and disadvantages attendant the use of existing prior art forage harvester drives, it is a primary object of the present invention to overcome same by providing a slip clutch means in combination with the power transmission means for forage harvesters.

Another object of the invention is to provide an easily shiftable clutch means to achieve an inherently smooth engagement and disengagement of the header and feed rolls as well as for providing very smooth and direct transmission of power from forward to reverse without the need to hesitate in a neutral condition.

A further object is to provide a novel combination of slip clutch and power transmission means which provides for a substantially slower and smoother reverse drive enabling easier unplugging of the feed rolls if plugging should occur, and enables the clutch to be disengaged when the reverse box is transmitting at full power. In a preferred form the clutch and directly related transmission means are enclosed and run in an oil bath.

The foregoing objects are achieved by a planetary type of transmission gearing in combination with a disc-band actuated slip type clutch for operation of the header and infeed conveying means. More specifically, the invention embodies a disc-band clutch means for clutching associated planetary gearing which is inherently smooth in operation and which substantially eliminates or greatly reduces shock loading on the gear drive train. This is achieved by utilizing a planetary gear construction including a sun gear splined on a driver, or input shaft; two planet pinion gears disposed on diametrically opposite sides of the sun gear and enmeshed therewith, said planet gears being carried by a planet carrier which is bushed onto the input shaft and also constitutes part of a multiple disc clutch construction associated therewith; and further includes driven output gear means bushed onto said input shaft, and said latter means having a large internal gear with which said planet pinion gears enmesh. Said clutch further comprises a plurality of driving discs splined to the input shaft, a plurality of driven discs interleaved with the driving discs and drivingly connected by means of their interengagement with a plurality of annularly spaced drive pins which also drivingly interconnect said planet carrier and a clutch pressure plate which is mounted for yieldable movement relative to the discs and to the planet carrier. Suitable lever means are combined with the pressure plate to selectively effect forward or positive drive engagement, neutral and reverse drive conditions of the drive means therethrough.

By the novel arrangement and combination of components, a considerably improved clutching drive mechanism for forage harvesters is evolved which overcomes the stated problems attendant with the prior art devices.

The aforesaid objects and advantages will become more apparent from a consideration of the following detailed specification taken in conjunction with the accompanying drawings which are illustrative of one preferred embodiment of this invention.

DESCRIPTION OF THE DRAWINGS

FIG. 3 is a cross-section shown on a somewhat enlarged scale and taken approximately on the irregular line 3—3 of FIG. 1, and depicting a planetary gear and clutch unit employed in the power transmission system;

FIG. 4 is a fragmentary cross sectional view taken on the line 4—4 of FIG. 3;

FIG. 5 is a fragmentary cross-section taken on the line 5—5 of FIG. 4, and is illustrative of the control mechanism for the power transmission system;

DESCRIPTION OF THE PREFERRED EMBODIMENT

Figure 1:
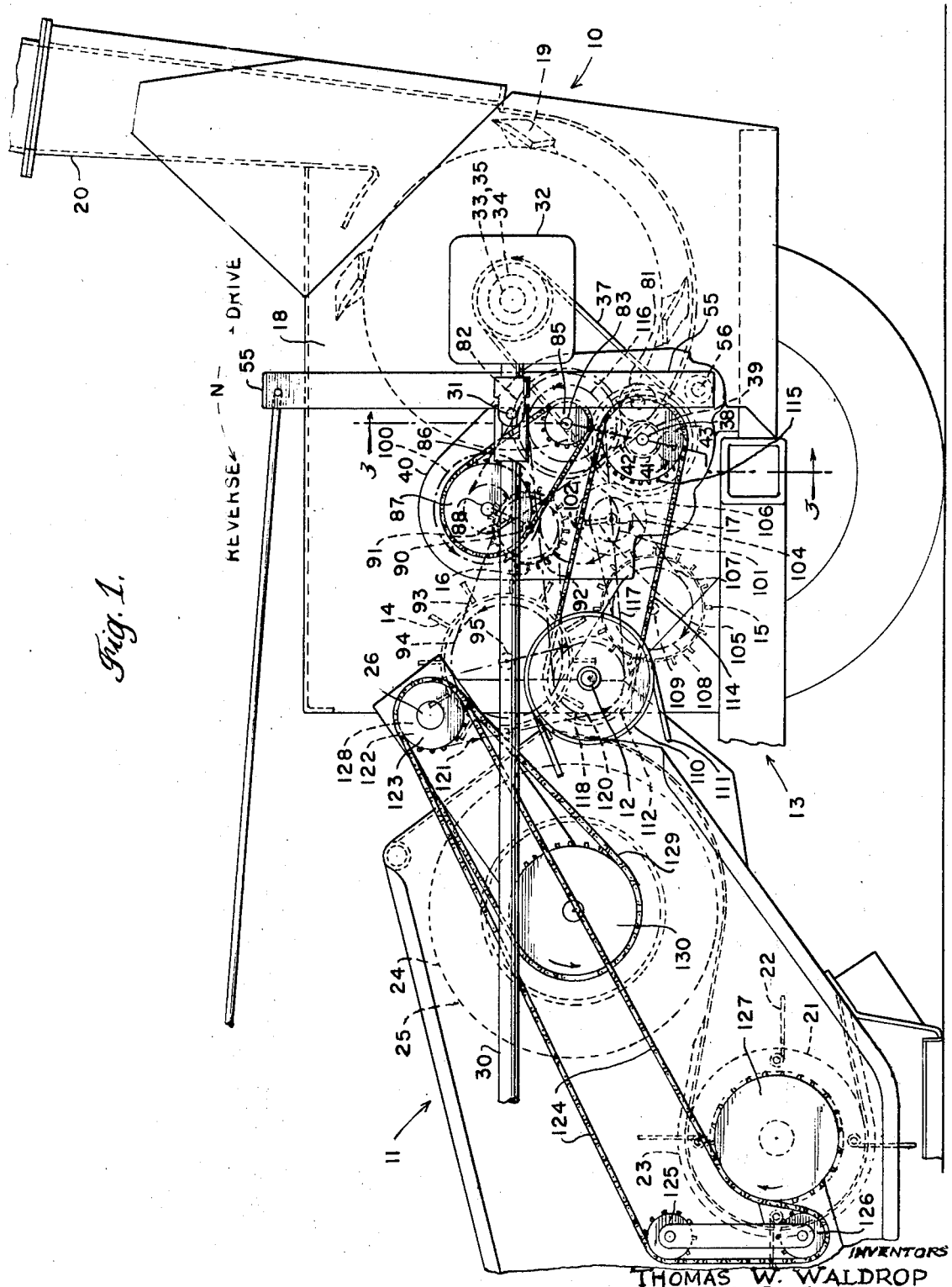
FIG. 1 is a fragmentary side elevational view of a forage harvester embodying a power transmission system constructed in accordance with the present invention with certain gears and chain drives indicated diagrammatically in dot-and-dash lines and with the direction arrows applied to indicate direction of rotation of the various driving elements when the forage harvester is operating to deliver forage.
Figure 2:
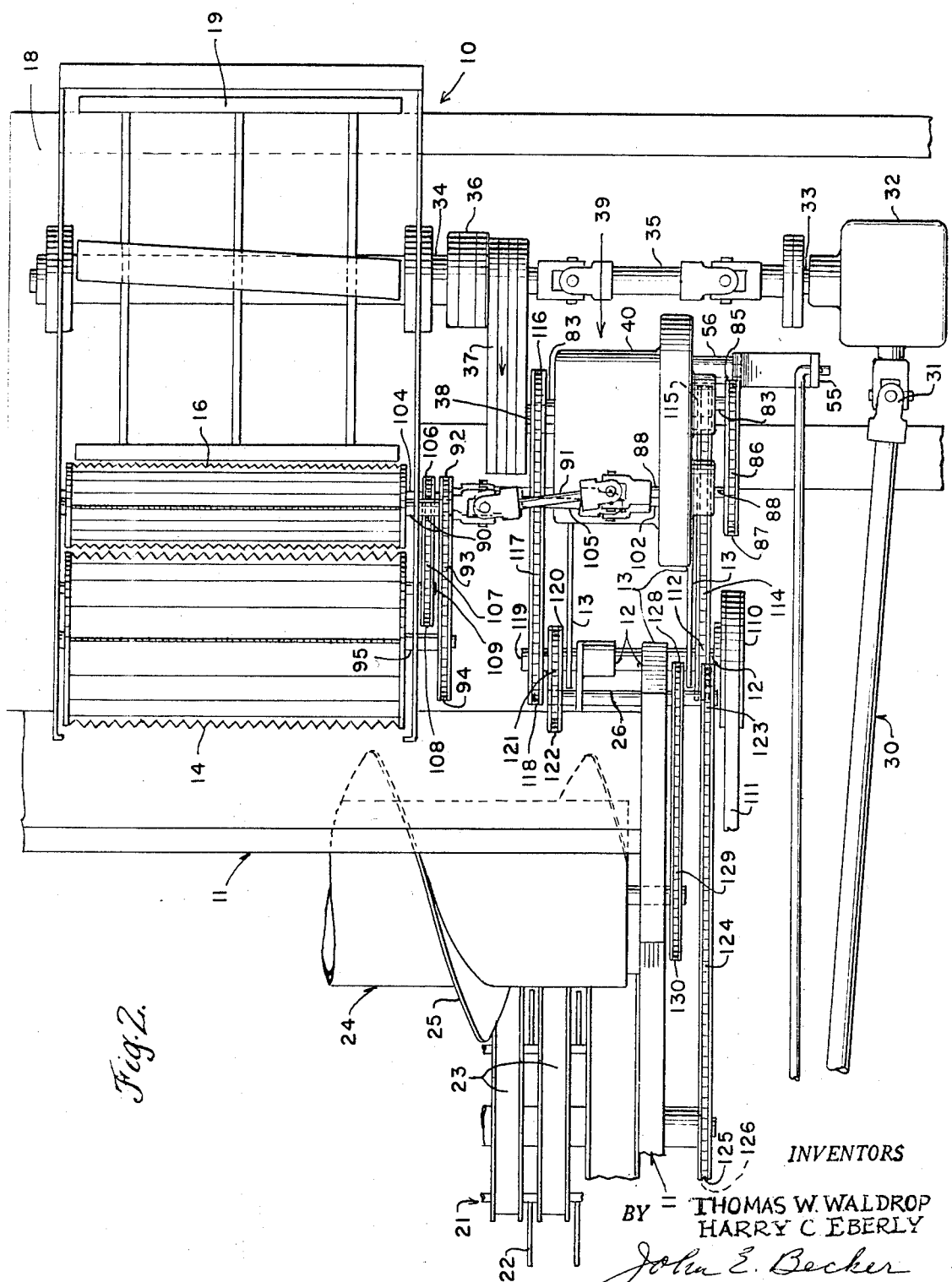
FIG. 2 is a plan view of FIG. 1.

Referring now to FIGS. 1 and 2 of the accompanying drawings, the improved power transmission system of the present invention is illustrated as applied to a forage harvester of wheeled frame construction generally designated 10, said harvester being of a reel type cutterhead and including a pickup unit designated generally at 11 and pivotally mounted at 12 on the suitable frame work 13. The harvester further comprises first upper and lower infeed conveyor means in the form of rolls 14 and 15 and second upper and lower infeed conveyor means in the form of rolls 16 and 17, all of which rolls are rotatably mounted within the housing 18. A cutterhead assembly 19 is rotatably mounted within the housing 18 rearwardly of the infeed conveyor rolls aforesaid, and a discharge spout 20 is provided which extends vertically above the rearward portion of the housing 18.

The pickup unit 11 comprises a conventional rotatable pickup reel 21 having radially projecting, laterally spaced pickup fingers or tines 22, a plurality of laterally spaced stripping, or doffing, members 23 between which the fingers 22 operate, a rotatable auger 24 having flights 25 for directing the crop material centrally thereof into the infeed conveyor means aforesaid. The auger unit 24 is also mounted for pivotal movement within header 21 and about shaft mount 26.

Although a pickup unit is shown, a sickle bar or row crop attachment could also be employed, that is, any device to deliver crop material to the infeed rolls. In the unit shown, harvested crop material to be comminuted is picked up by the rotatable pickup reel 21 of the pickup unit 11 and delivered to the infeed rolls 14–17 whereupon said material is then metered in mat-like form to the cutterhead 19 where it is comminuted and finally discharged through the discharge spout 20 to a suitable receptacle such as a wagon, not shown.

In this embodiment, the source of power for operating the forage harvester is by means of a power take-off connection 30 from a tractor or other draft vehicle (not shown) which tows the harvester in a well-known manner. The connection 30 is in the form of a universal shaft universally connected as at 31 to a right angle gearbox unit 32 of the harvester. The output shaft 33 of the gearbox unit 32 is drivingly connected to the shaft 34 of said cutterhead 19 by means of a universal shaft 35 and coupling 36 intermediately connecting said shafts 33 and 34. This output shaft 33 is also drivingly connected by means of suitable drive belt means 37 to the input shaft 38 of a slip clutch-planetary gear unit generally designated as 39 and located within a housing 40.

This latter combined unit 39 comprises input shaft 38 suitably journalled in the housing 40, a sun gear 41 directly splined onto the driver or input shaft 38, a pair of planet pinion gears 42 and 43 disposed on diametrically opposite sides of said sun gear and meshed therewith, and said planet pinions being carried by a planet carrier 44 which is rotatably mounted on said shaft 38 by means of a bearing bushing 45. The planet carrier 44 comprises a part of the otherwise generally well-known multiple disc clutch to be described and is directly associated with unit 39 which further includes a driven output gear means 46 bushed at 53 and 54 onto input shaft 38, said latter means including a large diameter internal gear 66 with which said planet pinion gears enmesh, a smaller diameter external pinion gear 67 and an axially extended hub 80 preferably integrally formed as a unit and to be described in more detail.

The combined unit 39 comprises a disc-band clutch generally designated 47 and is of interleaved disc construction, comprising a plurality of driving discs 48 splined at 52 to the input shaft 38, a plurality of driven discs 49 interleaved with the driving discs, with discs 49 supported on a plurality of annularly spaced drive pins 50 affixed to carrier 44 and said discs 49, via driving discs 48, drivingly interconnecting said input shaft 38 and planet carrier 44 with a suitable clutch pressure plate 51 which is mounted for yieldable axial movement relative to the discs and to the planet carrier as by lever means to be described and by coiled springs (not shown) disposed coaxially about the respective drive pins 50.

Suitable lever means are combined with the pressure plate to selectively effect positive forward drive, neutral and reverse drive conditions of the various header mechanisms and input feed means, and will now be described. The cltch 47 is engaged and disengaged by means of a control lever 55 (FIG. 3) secured on one end of a pivot shaft 56 mounted for rotation within housing 40. Also secured on the pivot shaft 56 near the opposite end is an actuating arm 57 carrying a roller 58 which is engageable with a cam lever 59 (FIG. 5), lever 59 being pivoted at 60 on a spring loaded collar 61 of a stud bolt 62 supported by the housing 40. The free end portion of lever 59 engages the roller 58 as at 63, and the intermediate cam portion 64 of the lever engages an anti-friction collar 65 which bears against the pressure plate 51 of the clutch.

Referring more particularly to FIGS. 3 and 4, there is shown a brake band 70 which substantially surrounds the planet carrier 44, said band being applied and released by means of an eccentric member 71 secured onto the pivot shaft 56 of said control lever 55, and with said eccentric being connected to a lug 72 disposed at one end of the brake band by a link 73. The brake band 70 is normally held in a released condition by means of a limiting rod 74 having one end thereof connected to another lug 75 affixed to the other end of said brake band, and having a stop nut or headed portion 76 at the other end of said rod and engageable on the outside of the housing 40. A spring 77 coaxially surrounds the rod 74 and is interposed between the lugs 72 and 75 in a manner to urge the brake band into its released position (FIG. 4). To apply the brake, the control lever 55 is swung in a counterclockwise direction as seen in FIGS. 1 and 4, thereby rocking the pivot shaft 56 in the same direction, whereby link 73 (FIG. 4) moves upward to effect contraction of the brake band to apply braking pressure to the outer periphery of the planet gear carrier 44.

With the parts in the position shown in FIGS. 3, 4, and 5, it is understood that the clutch 47 is disengaged and the brake band 70 is released, constituting the neutral condition, whereby the multiple discs are held in spaced apart condition by means of the expansion springs which surround the driving pins 50. With the input shaft 38 normally being driven in a counterclockwise direction, only the sun gear 41 rotates therewith, and in turn, the planet pinions 42 and 43, which are enmeshed therewith, freewheel within the internal gear 66 of the output gear means 46 with the result that the latter does not rotate, it remaining sationary due to the external load of the various drive attachments and feed roll mechanisms which are in operative drive engagement therewith.

To put the system into direct or forward drive condition, the clutch 47 is engaged while the brake band 70 remains in a released condition. To effect engagement with the clutch, the control lever 55 is swung to the right, as viewed in FIG. 1, whereby the roller 58 of the actuating arm 57 rides up onto the cam lug 68 (FIG. 5) of the lever 59 to exert pressure on the pressure plate 51 of the clutch thus firmly engaging the interleaved discs for clutching engagement. In this condition the driving discs 48, which are splined to the input shaft 38, impart rotation both to the clutch pressure plate 51 and to the planet gear carrier 44, with the result that said planet gear carrier 44 is rotated at the same speed with the input shaft 38. Inasmuch as the sun gear 41, which is also splined to said input shaft 38, is already rotating therewith, and because the planet carrier 44 also is now rotating therewith, it is apparent that there is no relative rotation between the sun gear and the planet gears. The result is that the output gear means 46, via internal gear 66, is driven therewith to ultimately effect drive of the crop pickup 21, auger 24, and the infeed rolls 14–17 which directs the crop material into cutterhead 19. The cutterhead is driven directly from the power take-off unit, and is controlled by the main clutch of the draft vehicle which drives the PTO unit. The other various drives will be further clarified in the following.

In the event plugging and stoppage of the infeed rolls, auger, or pickup means, it is desirable to reverse the system to unplug it. It is and will become more apparent that the clutch and planetary gear arrangement of this system will readily enable a smooth transition from the direct drive condition to the reverse condition as follows.

Assuming plugging has occurred and it is desired to reverse the system, the clutch is released and the brake band is simultaneously applied by movement of lever 55 to the left as shown in FIG. 1. It follows that the planet pinion carrier 44 is held stationary while the sun gear 41, which is being driven counterclockwise, rotates the planet pinions 42 and 43 clockwise which, in turn, rotates the output internal gear 66 also in a clockwise or reverse direction and at a much slower speed than the direct drive, due to the relative gear ratios involved and including additional output gears 67 and 82, to be described.

Referring again to the upper and lower infeed conveyor rolls and the drive means therefor, it will be seen that the upper, toothed, infeed rolls 14 and 16 receive their drive from output gear 67 which is substantially smaller in diameter than, but preferably integrally or otherwise unitarily formed with the larger output internal gear 66 (FIGS. 3 and 6), said gear 67 in turn meshing with an idler gear 81 which in turn meshes with a larger drive gear 82. The gear 82 is secured on an output shaft 83 which is journalled by means of suitable bearings 84, within opposite sides of the housing 40, with said shaft having opposite ends projecting from opposite sides of said housing 40 onto which other drive sprockets, to be described, are attached.

Figure 6:
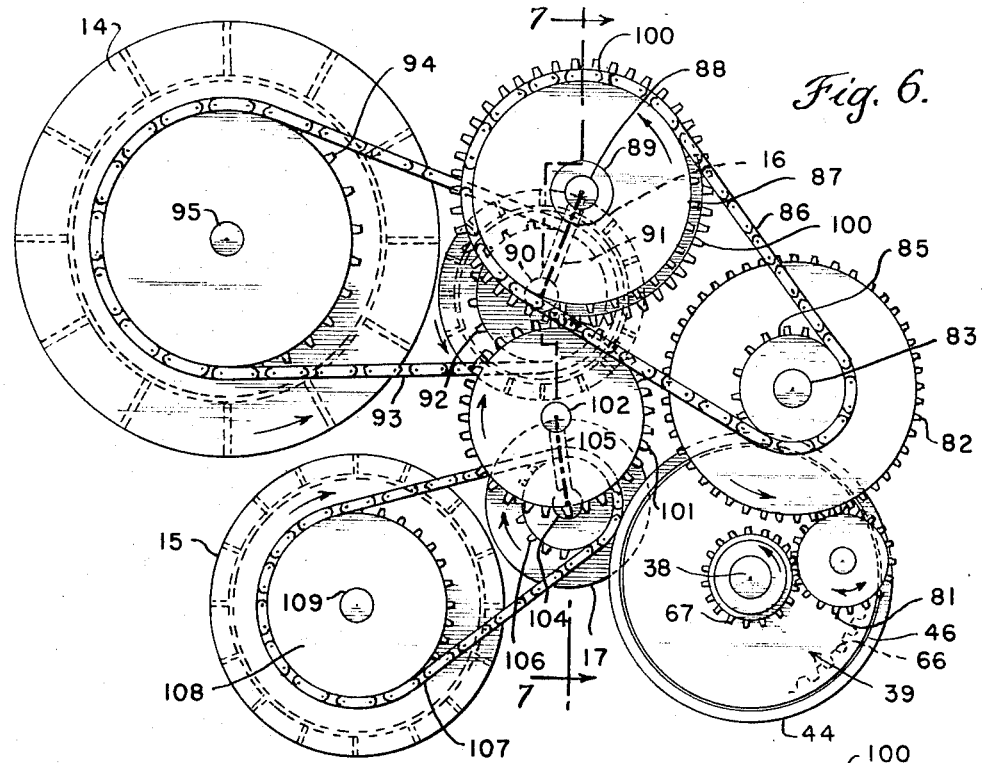
FIG. 6 is an elevational view illustrating in greater detail the drive gearing and chain drives for the infeed conveyor rolls on a forage harvester, with the housing structure omitted for the sake of clarity, and with the direction arrows applied to indicate the direction of rotation when the infeed rolls are feeding crop material.
Figure 7:
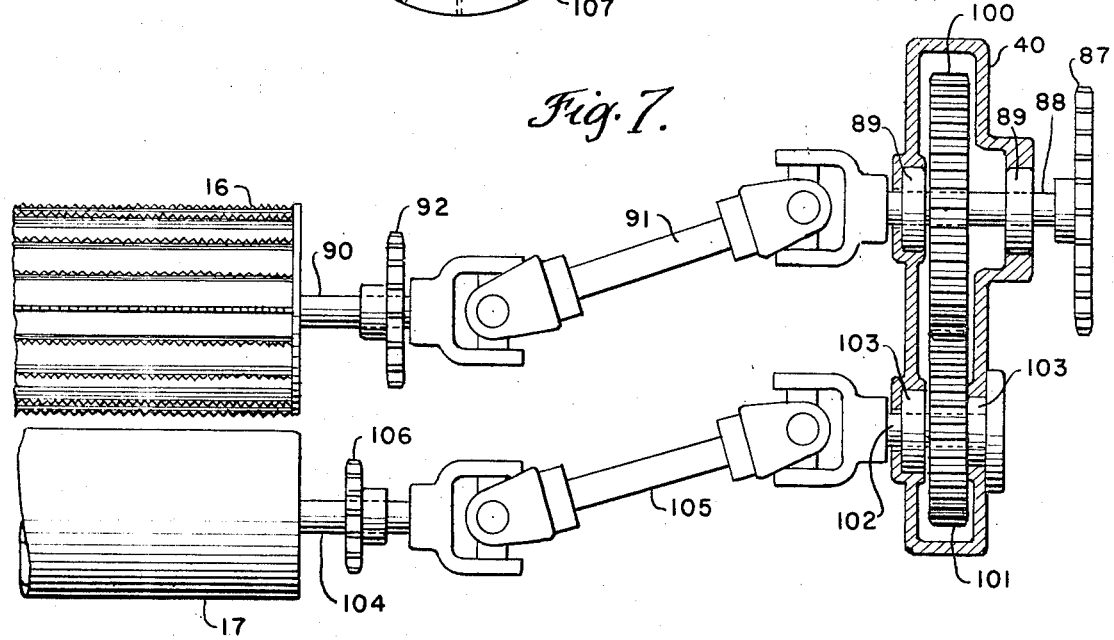
FIG. 7 is a view partially in elevation and partially in cross-section as viewed substantially on the irregular line 7—7 of FIG. 6.

Referring to FIGS. 3, 6, and 7, the shaft 83 is further provided with an intermediate drive sprocket 85 attached to its outer right-hand end (FIG. 3) and which has a chain drive connection 86 with a driven sprocket 87. Sprocket 87 is secured on shaft 88, which is supported by bearings 89—89 within a narrowed portion of the same housing 40. FIG. 7 shows how shaft 88 thus is drivingly connected with shaft 90 on which the second upper infeed roll 16 is mounted by means of a universal drive shaft 91 intermediately connecting said shafts 88 and 90. A still further drive sprocket 92 is secured onto said shaft 90, outboard of the end of the toothed infeed roll 16 (FIG. 7). The sprocket 92 has a chain drive connection 93 with the drive sprocket 94 (FIGS. 1 and 6) secured upon the shaft 95 of the first upper infeed roll 14. Accordingly, it will be seen from the foregoing that through this system of gears and sprockets and chains, both of the upper infeed rolls 14 and 16 are driven from the output internal gear 46 of the planetary gear unit 39.

Referring now to the lower infeed conveyor rolls 15 and 17, respectively (FIGS. 1, 6, and 7) it is apparent that the lower, smooth infeed roll 17 is driven by a relatively large diameter gear 100 which is rotatable with said shaft 88, whereupon said gear 100 meshes with the somewhat smaller diameter gear 101 disposed therebelow and secured upon a stub shaft 102 which also is journalled within the narrow portion of the casing 40 by means of bearings 103—103. The shaft 102 is drivingly connected to shaft 104 of the lower, smooth surfaced, infeed roll 17 by means of a universal shaft 105.

The other or second lower, toothed infeed roll 15 on shaft 109 is then driven by chain 107 from said shaft 104 of said lower roll 17 by means of aligned sprockets 106 and 108 secured to the shafts 104 and 109, respectively (FIGS. 1 and 6).

It will be observed from the direction arrows as applied in FIGS. 1 and 6 that when the drive system is in its forward drive, that pre-cut crop material is picked up and fed to cutterhead 19, with the upper infeed rolls 14 and 16 respectively being driven in a counterclockwise direction, and that the lower infeed rolls 15 and 17 are driven in a clockwise direction.

Briefly referring back to FIGS. 1, 2, and 3, if the header attachment were of the sickle bar type, the sickle would be normally driven by means including a sheave 110 and belt 111 with sheave 110 being rotatively mounted on the outboard end of pivot shaft 12. Sheave 110 is unitarily connected to the adjacent driven sprocket 112 rotatably mounted therewith on shaft 12. Drive chain 114 drives sprocket 112 from the drive sprocket 115 mounted on the outboard end of the hub 80 of output gear means 46 (FIG. 3).

The earlier described pickup reel 21 is driven from the shaft 83 which is journalled within the housing 40, by means of a chain driven sprocket 116 secured on the inboard or left end of shaft 83, as viewed in FIG. 3. A chain 117 drivingly connects said sprocket 116 with another drive sprocket 118 affixed on the pivot shaft 12. Additional intermediate drive means is provided by means of another drive sprocket 120 secured outboard of sprocket 118 and on said shaft 12 (FIGS. 1 and 2). A chain 121 drivingly interconnects said sprocket 120 with another intermediate drive sprocket 122 mounted on the auger pivot shaft 26 and disposed upwardly and slightly forward of sprocket 120. Another sprocket 123 is secured on the outboard end of said shaft 26, and by means of chain 124 and the plurality of sprockets 125, 126, and pickup reel sprocket 127, as seen in FIG. 1, provides for the drive of the pickup reel 21.

Also secured on said shaft 26 is another drive sprocket 128 to impart the drive to the auger 24. Said sprocket 128 is disposed slightly inboard of the aforementioned sprocket 123 and is connected by means of drive chain 129 to a sprocket 130 which is secured to the shaft of the auger 24, as better seen in FIGS. 1 and 2.

It is now apparent from the foregoing description of the various drives, that when the control lever 55 is readily shifted to the right as seen in FIG. 1, the disc clutch 47 becomes engaged, and with the brake band 70 remaining in its released condition, the drive from the power source, as hereinbefore described, is directed to the input shaft 38 of the planetary gear unit whereupon it is smoothly transmitted to the output gear means 46. Therefore, through these related systems of gears and chain drives, rotation of the mower drive pulley 110 in instances where needed, the pickup reel 21, the auger 24, the infeed rolls 14–17 and the cutterhead are all effected in a forward feed direction.

In the event of excess overloading of the machine whereby the infeed rolls become plugged, or jammed, the utilization of this novel combination of a slip type, disc-band clutch and planetary gear unit is most advantageous in that it provides a safety overload means for the infeed conveyor rolls which can be readily reversed to effect unplugging.

The reversal of the drive for the respective members is accomplished by shifting lever 55 (FIG. 1) to the left so as to simultaneously release the clutch 47 and apply the brake band 70, which action serves to reverse the direction as well as to reduce the speed of the output gear means 46 and ultimately that of the said infeed rolls and other related components. The speed reduction obtained when in reverse is achieved by driving the larger intermediate drive gear 82 on shaft 83 via the smaller idler gear 81 and smaller output gear 67, thereby resulting in an easy unplugging operation.

In actual practice, it has been found that by utilizing appropriate gear ratios to derive a forward drive speed of 204 r.p.m. of said shaft 83 for the attendant drive system, and a reverse speed of 82.5 r.p.m., the resultant performance has proved very efficient. By utilizing a combined disc and band type clutching together with the planetary gear arrangement all of which in a preferred embodiment are encased and run in an oil bath, the clutch can be disengaged very easily even when the drive system is transmitting at full power; and with said transmission of power being inherently smooth while simultaneously reducing the shock loading of the drive system to a minimum. By means of this improved arrangement, there is very little if any drift or windmilling perhaps up to 10 seconds of the various drives associated with this safety overload means.

It is apparent from the foregoing that an improved forage harvester drive system embodying the novel combination of a slip type clutch and planetary gear transmission, has been evolved which achieves the objects and advantages as set forth in the preamble and throughout the specification hereof. It is understood that certain spring-loaded tension idler gears related to various of the drive chains have been omitted for the sake of clarity in the drawings.

While this invention has been described in connection with a particular embodiment, it will be understood that it is capable of modification and that this application is intended to cover any variations, uses, or adaptations following, in general, the principles of the invention and including such departures from the present disclosure as come within known or customary practice in the art to which the invention pertains and as may fall within the scope of the invention or the limits of the appended claims.

Having thus described out invention, what we claim is:

1. In a forage harvester:
 (a) a rotatable cutterhead for comminuting crop material,
 (b) upper and lower infeed conveyor means for delivering previously cut crop material in mat-like form to said cutterhead,
 (c) means for transmitting power from a suitable power source for operatively driving the cutterhead and for operating said infeed means, an improvement comprising in combination therewith
 (d) drive means for forwardly driving said infeed conveyor means to feed crop material to said cutterhead at a certain speed and for driving said infeed conveyor means in reverse at a speed less than said certain speed,
 (e) slip clutch means having a gripping relation with said drive means to drive said infeed conveyor means forwardly and a released relation with said drive means to permit said drive means to slowly drive said infeed conveyor means in reverse with a smooth transmission of said drive means when shifting from said gripping relation to said released relation and with said slip clutch means providing a safety overload when in the gripping relation.

2. A forage harvester as defined in claim 1, wherein the slip clutch means comprises a planetary gear unit.

3. A forage harvester as defined in claim 1, wherein the slip clutch means comprises a planetary gear unit and a disc-band actuating means.

4. In a forage harvester comprising in combination:
 (a) a wheeled support frame structure adapted to travel generally in a forward direction over the ground,
 (b) a rotatable cutterhead for comminuting crop material and carried by said frame,
 (c) means for engaging crop material on the ground and conveying it into said cutterhead,
 (d) said means comprising upper and lower infeed conveyors for delivering previously cut crop material in mat-like form to said cutterhead on forward drive;
 (e) first gear train means for transmitting power from a suitable power source for operatively driving the cutterhead in one direction and for operating said infeed means to convey material toward the cutterhead infeed means,
 (f) slip clutch and second gear train means deriving input power from said first gear train means under a gripping relation between said slip clutch means and said second gear train means to forwardly drive said upper and lower infeed conveyors and under a release relation between said slip clutch means and said second gear train means to permit said second gear train means to drive said infeed conveyers slowly in a reverse drive and providing safety overload means for the infeed means in the gripping relation.

5. A forage harvester as defined in claim 4, wherein the second gear train means comprises a planetary gear unit having an input shaft coupled to said first gear train means and a second output shaft coupled to said upper and lower infeed conveyors, a first gear mounted on said input shaft for rotation therewith, a second gear mounted on said output shaft for rotation therewith, a carrier rotatably mounted on said input shaft and having planet gears engaging said first and second gears and said slip clutch means having means attached to said carrier and slidable means on said input shaft to rotate therewith and being movable into engagement with said carrier attached means to lock said carrier to rotate with said first gear and for rotation of said second gear in the direction of said first gear and for rotation of said second gear in the direction of said first gear and being movable out of engagement to uncouple said carrier from said input shaft, brake means movable into a holding relation with said carrier on movement of said slidable means out of engagement to stop said carrier and reverse said second gear by rotation of planet gears in said planetary gear unit and movable out of said holding relation on movement of said slidable means into engagement with said attached means for smooth reversal of rotation of said output shaft.

6. A forage harvester as defined in claim 5 including a housing enclosing the slip clutch means and planetary gear unit.

7. A forage harvester as defined in claim 6, wherein the housing is filled with lubricant fluid.

8. In a forage harvester comprising in combination:
 (a) wheel support frame structure adapted to travel generally in a forward direction over the ground,
 (b) a rotatable cutterhead for comminuting crop material and carried by said frame,
 (c) means for engaging said crop material on the ground and conveying it into said cutterhead,
 (d) said means comprising upper and lower infeed conveyors for delivering previously cut crop material in a mat-like form to said cutterhead,
 (e) first gear train means for transmitting the power from a suitable power source for operatively driving the cutterhead in one direction,
 (f) slip clutch and planetary gear unit means deriving input power from said first gear train means and providing safety overload means for said infeed conveyors and having
  a power input shaft driven by said first gear train means, an axially fixed carrier with a disc axially slidable thereon, an axially shiftable clutch pressure plate positioned in spaced apart relation and coaxially bushed on said input shaft for selective rotation therewith, at least one driving disc rotatably fixed with said input shaft and interposed between said clutch pressure plate and said carrier disc and pressed into engagement with said carrier disc by said pressure plate, output gear means having a large diameter internal gear and an axially spaced smaller diameter external spur gear and unilaterally bushed on said output shaft, a sun gear mounted for rotation with said input shaft and disposed intermediate an axially fixed clutch pressure plate and said output gear means, a pair of planet gears carried by the axially fixed carrier remote from said discs, said planet gears being in circumferentially spaced apart and rotatably enmeshed both with said sun gear and with the internal gear of the output gear means, brake means holding said axially fixed carrier when said pressure plate is in spaced apart relation for reverse driving of said output gear means and releasing said carrier on engagement of said discs for forward driving of said output gear means, and means for actuating said pressure plate and brake means to selectively effect forward drive, reverse drive and an intermediate neutral while said engaged discs provide safety overload by slippage under excessive overloading in forward drive.

9. A forage harvester as defined in claim 8, wherein the axially fixed clutch pressure plate constitutes the the planet gear carrier, and including means operatively connected with clutch control means for braking said carrier.

References Cited

UNITED STATES PATENTS

| | | |
|---|---|---|
| 1,129,992 | 3/1915 | Klumb. |
| 1,204,579 | 11/1916 | McCulloch _____ 146—107 XR |
| 2,196,645 | 4/1940 | Saiberlich _____ 146—118 |
| 2,269,828 | 1/1942 | Michel et al. |
| 2,612,974 | 10/1952 | Krause _____ 146—118 XR |
| 2,651,162 | 9/1953 | Whisler. |

LOUIS G. MANCENE, Primary Examiner

J. A. OLIFF, Assistant Examiner

U.S. Cl. X.R.

56—1, 364; 146—107, 120